US012745024B2

(12) United States Patent
Liu et al.

(10) Patent No.: US 12,745,024 B2
(45) Date of Patent: Sep. 22, 2026

(54) UPSTREAM TRANSMISSION RESOURCE ALLOCATION METHOD AND RELATED DEVICE

(71) Applicant: Huawei Technologies Co., Ltd., Shenzhen (CN)

(72) Inventors: Gengchen Liu, Dongguan (CN); Yanzhao Lu, Dongguan (CN); Liangchuan Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 18/614,095

(22) Filed: Mar. 22, 2024

(65) Prior Publication Data

US 2024/0236532 A1 Jul. 11, 2024

Related U.S. Application Data

(63) Continuation of application No. PCT/CN2022/114663, filed on Aug. 25, 2022.

(30) Foreign Application Priority Data

Sep. 23, 2021 (CN) ......................... 202111115951.X

(51) Int. Cl.
*H04Q 11/00* (2006.01)

(52) U.S. Cl.
CPC . *H04Q 11/0067* (2013.01); *H04Q 2011/0086* (2013.01)

(58) Field of Classification Search
None
See application file for complete search history.

(56) References Cited

U.S. PATENT DOCUMENTS 8,837,510 B1 * 9/2014 Benhaim ............ H04Q 11/0067 370/432
2006/0153222 A1 * 7/2006 Van Caenegem ..... H04J 3/1694 370/445

(Continued)

FOREIGN PATENT DOCUMENTS

WO 2021130804 A1 7/2021

OTHER PUBLICATIONS

Vuong V. Mai and Anh T. Pham, Adaptive rate-based MAC Protocols Design and Analysis for Integrated FSO/PON Networks, Computer Communications Lab, The University of Aizu Aizuwakamatsu, Fukushima, Japan, IEEE ICC Jun. 8, 2015, total 6 pages.

*Primary Examiner* — Nathan M Cors
(74) *Attorney, Agent, or Firm* — Slater Matsil, LLP

(57) ABSTRACT

Embodiments of this application disclose an upstream transmission resource allocation method and a related device. First, an OLT determines an upstream rate threshold of an ONU based on transmission quality information of upstream data sent by the ONU. The OLT further obtains a to-be-transmitted data amount of the ONU. Then, the OLT determines an upstream transmission timeslot of the ONU and an upstream transmission rate of the ONU. The upstream transmission rate of the ONU is less than or equal to the upstream rate threshold. The ONU is configured to send data of the to-be-transmitted data amount to the OLT in the upstream transmission timeslot based on the upstream transmission rate.

20 Claims, 5 Drawing Sheets

(56) References Cited

U.S. PATENT DOCUMENTS

| | | | | |
|---|---|---|---|---|
| 2008/0013950 | A1* | 1/2008 | Boudreault | H04J 14/0216<br>398/59 |
| 2011/0311225 | A1* | 12/2011 | Feng | H04B 10/27<br>398/43 |
| 2012/0008948 | A1* | 1/2012 | Kazawa | H04Q 11/0067<br>398/58 |
| 2013/0039182 | A1* | 2/2013 | Das | H04Q 11/0067<br>370/235 |
| 2015/0326479 | A1* | 11/2015 | Goodson | H04L 12/2854<br>370/236 |
| 2017/0111137 | A1* | 4/2017 | Gao | H04B 10/25 |
| 2023/0353915 | A1* | 11/2023 | Zhang | H04Q 11/0067 |

* cited by examiner

UPSTREAM TRANSMISSION RESOURCE ALLOCATION METHOD AND RELATED DEVICE

CROSS-REFERENCE TO RELATED APPLICATIONS

This application is a continuation of International Application No. PCT/CN2022/114663, filed on Aug. 25, 2022, which claims priority to Chinese patent application Ser. No. 20/211,1115951.X, filed on Sep. 23, 2021. The disclosures of the aforementioned applications are hereby incorporated by reference in their entireties.

TECHNICAL FIELD

This application relates to the field of optical communications, and in particular, to an upstream transmission resource allocation method and a related device.

BACKGROUND

In a passive optical network (PON) of a point-to-multipoint (P2MP) architecture, an optical line terminal (OLT) sends downstream data to a plurality of optical network units (ONU) in a broadcast manner. To avoid collisions between different ONUs, different ONUs send upstream data to the OLT in different timeslots. Therefore, the OLT needs to monitor traffic of each ONU in real time, and allocate an upstream transmission timeslot to each ONU by using a dynamic bandwidth assignment (DBA) technology.

Specifically, each ONU reports an upstream data amount of the ONU to the OLT, and the OLT allocates the upstream transmission timeslot to each ONU based on the upstream data amount of each ONU and a specified upstream transmission rate. It should be understood that the specified upstream transmission rate is usually a relatively low rate, to ensure that each ONU in a system has a long enough timeslot to transmit upstream data. However, for some ONUs with relatively high upstream transmission rates, only a relatively short timeslot may be required to complete upstream data transmission. If the OLT allocates the upstream transmission timeslot in the existing manner, a waste of upstream transmission resources is caused.

SUMMARY

Embodiments of this application provide an upstream transmission resource allocation method and a related device. It should be noted that an upstream transmission resource includes an upstream transmission timeslot and an upstream transmission rate.

According to a first aspect, an embodiment of this application provides an upstream transmission resource allocation method. The method includes a plurality of steps, and the method is performed by an OLT. First, the OLT determines an upstream rate threshold of an ONU based on transmission quality information of upstream data sent by the ONU. It should be understood that the upstream rate threshold of the ONU is less than or equal to a maximum sending rate that can be supported by the ONU in a current status. In different channel conditions, the ONU has different upstream transmission quality. The upstream transmission quality directly affects the maximum sending rate that can be currently supported by the ONU. The OLT further obtains a to-be-transmitted data amount of the ONU. Then, the OLT determines an upstream transmission timeslot of the ONU and an upstream transmission rate of the ONU. The upstream transmission rate of the ONU is less than or equal to the upstream rate threshold. The ONU is configured to send data of the to-be-transmitted data amount to the OLT in the upstream transmission timeslot based on the upstream transmission rate. In other words, on a premise that it is ensured that the upstream transmission rate of the ONU does not exceed the upstream rate threshold, the OLT may flexibly allocate the upstream transmission timeslot and the upstream transmission rate to the ONU based on the to-be-transmitted data amount of the ONU.

In this implementation, an upstream transmission resource allocated by the OLT to the ONU includes the upstream transmission timeslot of the ONU, and further includes the upstream transmission rate of the ONU. In addition to different to-be-transmitted data amounts, different ONUs may have different upstream rate thresholds. Therefore, the OLT can more properly allocate upstream transmission resources to different ONUs by comprehensively considering upstream rate thresholds of the ONUs and to-be-transmitted data amounts of the ONUs, thereby effectively avoiding a waste of upstream transmission resources.

In some possible implementations, the method further includes: the OLT sends configuration information to the ONU, where the configuration information indicates the upstream transmission timeslot of the ONU and the upstream transmission rate of the ONU, so that the ONU subsequently sends data to the OLT in the upstream transmission timeslot based on the upstream transmission rate.

In some possible implementations, the configuration information includes a bandwidth map (BWmap), a first field in the BWmap indicates the upstream transmission timeslot of the ONU, and a second field in the BWmap indicates the upstream transmission rate of the ONU. In the foregoing manner, the OLT notifies the ONU of the allocated upstream transmission timeslot and upstream transmission rate by using the BWmap. A BWmap defined in an existing standard is extended, thereby enhancing practicability of this solution.

In some possible implementations, the configuration information includes a data frame and a control frame, a BWmap in the data frame indicates the upstream transmission timeslot of the ONU, and a rate configuration table in the control frame indicates the upstream transmission rate of the ONU. In the foregoing manner, a BWmap defined in an existing standard is reused to configure the upstream transmission timeslot for the ONU, and the control frame is defined to configure the upstream transmission rate for the ONU, thereby improving flexibility of this solution.

In some possible implementations, the ONU includes a plurality of transmission containers (T-CONT). For example, the ONU includes a first transmission container and a second transmission container. The transmission quality information includes first transmission quality information of first upstream data sent by the first transmission container and second transmission quality information of second upstream data sent by the second transmission container, and the upstream rate threshold includes a first upstream rate threshold of the first transmission container and a second upstream rate threshold of the second transmission container. That the OLT determines an upstream rate threshold based on transmission quality information includes: the OLT determines the first upstream rate threshold based on the first transmission quality information, and determines the second upstream rate threshold based on the second transmission quality information. In this implementation, the transmission container is a carrier that carries a service in an upstream direction, and the OLT needs to obtain an upstream rate threshold of each transmission container, to allocate an upstream transmission resource to each transmission container.

In some possible implementations, the to-be-transmitted data amount of the ONU includes a first to-be-transmitted data amount of the first transmission container and a second to-be-transmitted data amount of the second transmission container. That the OLT determines an upstream transmission timeslot of the ONU and an upstream transmission rate of the ONU includes: the OLT determines a first upstream transmission timeslot of the first transmission container and a first upstream transmission rate of the first transmission container; and the OLT determines a second upstream transmission timeslot of the second transmission container and a second upstream transmission rate of the second transmission container. The upstream transmission timeslot of the ONU includes the first upstream transmission timeslot and the second upstream transmission timeslot, and the upstream transmission rate of the ONU includes the first upstream transmission rate and the second upstream transmission rate. The first upstream transmission rate is less than or equal to the first upstream rate threshold, and the first transmission container is configured to send data of the first to-be-transmitted data amount to the OLT in the first upstream transmission timeslot based on the first upstream transmission rate. The second upstream transmission rate is less than or equal to the second upstream rate threshold, and the second transmission container is configured to send data of the second to-be-transmitted data amount to the OLT in the second upstream transmission timeslot based on the second upstream transmission rate. In this implementation, the transmission container is a basic unit used by the OLT to perform upstream transmission resource assignment, so that the OLT can flexibly allocate corresponding upstream transmission resources to different transmission containers. Therefore, an actual application effect is more ideal.

In some possible implementations, a priority of the first upstream data is different from a priority of the second upstream data. That the OLT determines a first upstream transmission timeslot of the first transmission container and a first upstream transmission rate of the first transmission container includes: the OLT determines the first upstream transmission timeslot of the first transmission container and the first upstream transmission rate of the first transmission container based on the priority of the first upstream data. That the OLT determines a second upstream transmission timeslot of the second transmission container and a second upstream transmission rate of the second transmission container includes: the OLT determines the second upstream transmission timeslot of the second transmission container and the second upstream transmission rate of the second transmission container based on the priority of the second upstream data. In this implementation, the OLT further allocates an upstream transmission resource with reference to a priority of data, to provide a more proper upstream transmission resource allocation manner with higher actual application value.

In some possible implementations, a priority of the first transmission container is higher than a priority of the second transmission container, the first transmission container is configured to store the first upstream data, and the second transmission container is configured to store the second upstream data. In this implementation, a transmission container that stores data with a higher priority also has a higher priority, and the OLT preferentially allocates a corresponding upstream transmission timeslot and upstream transmission rate to the transmission container of the higher priority, to preferentially ensure a communications requirement of a service with a high priority.

In some possible implementations, the to-be-transmitted data amount is equal to a product of duration of the upstream transmission timeslot and the upstream transmission rate, to ensure that all to-be-transmitted data of the ONU can be successfully transmitted to the OLT.

In some possible implementations, the method further includes: the OLT performs channel monitoring on the upstream data sent by the ONU, to obtain the transmission quality information. In the foregoing manner, a specific implementation of obtaining the transmission quality information is provided, thereby enhancing implementability of this solution.

In some possible implementations, the transmission quality information includes at least one of a signal-to-noise ratio (SNR), an error vector magnitude (EVM), a quality factor (Q-factor), and the like, thereby improving scalability of this solution.

According to a second aspect, an embodiment of this application provides an upstream transmission resource allocation method. The method includes a plurality of steps, and the method is performed by an ONU. The ONU receives configuration information sent by an OLT. The configuration information indicates an upstream transmission timeslot of the ONU and an upstream transmission rate of the ONU. The upstream transmission timeslot and the upstream transmission rate are determined by the OLT, and the upstream transmission rate is less than or equal to an upstream rate threshold. The upstream rate threshold is determined by the OLT based on transmission quality information of upstream data sent by the ONU. Then, the ONU sends data of a to-be-transmitted data amount to the OLT in the upstream transmission timeslot based on the upstream transmission rate. The to-be-transmitted data amount is further obtained by the OLT, to be used as one of bases for determining, by the OLT, the upstream transmission timeslot and the upstream transmission rate.

In some possible implementations, the configuration information includes a BWmap, a first field in the BWmap indicates the upstream transmission timeslot of the ONU, and a second field in the BWmap indicates the upstream transmission rate of the ONU.

In some possible implementations, the configuration information includes a data frame and a control frame, a BWmap in the data frame indicates the upstream transmission timeslot of the ONU, and a rate configuration table in the control frame indicates the upstream transmission rate of the ONU.

In some possible implementations, the ONU includes a plurality of transmission containers, and the ONU includes a first transmission container and a second transmission container. The transmission quality information includes first transmission quality information of first upstream data sent by the first transmission container and second transmission quality information of second upstream data sent by the second transmission container. The upstream rate threshold includes a first upstream rate threshold of the first transmission container and a second upstream rate threshold of the second transmission container. The first upstream rate threshold is determined by the OLT based on the first transmission quality information. The second upstream rate threshold is determined by the OLT based on the second transmission quality information.

In some possible implementations, the configuration information indicates a first upstream transmission timeslot of the first transmission container, a first upstream transmission rate of the first transmission container, a second upstream transmission timeslot of the second transmission container, and a second upstream transmission rate of the second transmission container. The to-be-transmitted data amount of the ONU includes a first to-be-transmitted data amount of the first transmission container and a second to-be-transmitted data amount of the second transmission container. The upstream transmission timeslot includes the first upstream transmission timeslot and the second upstream transmission timeslot. The upstream transmission rate includes the first upstream transmission rate and the second upstream transmission rate. The first upstream transmission timeslot and the first upstream transmission rate are determined by the OLT. The second upstream transmission timeslot and the second upstream transmission rate are determined by the OLT. The first upstream transmission rate is less than or equal to the first upstream rate threshold, and the first transmission container is configured to send data of the first to-be-transmitted data amount to the OLT in the first upstream transmission timeslot based on the first upstream transmission rate. The second upstream transmission rate is less than or equal to the second upstream rate threshold, and the second transmission container is configured to send data of the second to-be-transmitted data amount to the OLT in the second upstream transmission timeslot based on the second upstream transmission rate.

In some possible implementations, a priority of the first upstream data is different from a priority of the second upstream data. The first upstream transmission timeslot and the first upstream transmission rate are determined by the OLT based on the priority of the first upstream data. The second upstream transmission timeslot and the second upstream transmission rate are determined by the OLT based on the priority of the second upstream data.

In some possible implementations, a priority of the first transmission container is higher than a priority of the second transmission container, the first transmission container is configured to store the first upstream data, and the second transmission container is configured to store the second upstream data.

In some possible implementations, the to-be-transmitted data amount is equal to a product of duration of the upstream transmission timeslot and the upstream transmission rate.

In some possible implementations, the transmission quality information includes at least one of an SNR, an EVM, and a quality factor.

According to a third aspect, this application provides an OLT. The OLT includes a transceiver unit and a processing unit. The processing unit is configured to determine an upstream rate threshold of an optical network unit ONU based on transmission quality information of upstream data sent by the ONU. The transceiver unit is configured to obtain a to-be-transmitted data amount of the ONU. The processing unit is further configured to determine an upstream transmission timeslot of the ONU and an upstream transmission rate of the ONU, where the upstream transmission rate is less than or equal to the upstream rate threshold, and the ONU is configured to send data of the to-be-transmitted data amount to the OLT in the upstream transmission timeslot based on the upstream transmission rate.

In some possible implementations, the transceiver unit is further configured to send configuration information to the ONU, where the configuration information indicates the upstream transmission timeslot of the ONU and the upstream transmission rate of the ONU.

In some possible implementations, the configuration information includes a BWmap, a first field in the BWmap indicates the upstream transmission timeslot of the ONU, and a second field in the BWmap indicates the upstream transmission rate of the ONU.

In some possible implementations, the configuration information includes a data frame and a control frame, a BWmap in the data frame indicates the upstream transmission timeslot of the ONU, and a rate configuration table in the control frame indicates the upstream transmission rate of the ONU.

In some possible implementations, the ONU includes a plurality of transmission containers. The ONU includes a first transmission container and a second transmission container, the transmission quality information includes first transmission quality information of first upstream data sent by the first transmission container and second transmission quality information of second upstream data sent by the second transmission container, and the upstream rate threshold includes a first upstream rate threshold of the first transmission container and a second upstream rate threshold of the second transmission container. The processing unit is specifically configured to: determine the first upstream rate threshold based on the first transmission quality information, and determine the second upstream rate threshold based on the second transmission quality information.

In some possible implementations, the to-be-transmitted data amount of the ONU includes a first to-be-transmitted data amount of the first transmission container and a second to-be-transmitted data amount of the second transmission container. The processing unit is specifically configured to: determine a first upstream transmission timeslot of the first transmission container and a first upstream transmission rate of the first transmission container, where the first upstream transmission rate is less than or equal to the first upstream rate threshold, and the first transmission container is configured to send data of the first to-be-transmitted data amount to the OLT in the first upstream transmission timeslot based on the first upstream transmission rate; and determine a second upstream transmission timeslot of the second transmission container and a second upstream transmission rate of the second transmission container, where the second upstream transmission rate is less than or equal to the second upstream rate threshold, and the second transmission container is configured to send data of the second to-be-transmitted data amount to the OLT in the second upstream transmission timeslot based on the second upstream transmission rate. The upstream transmission timeslot includes the first upstream transmission timeslot and the second upstream transmission timeslot, and the upstream transmission rate includes the first upstream transmission rate and the second upstream transmission rate.

In some possible implementations, a priority of the first upstream data is different from a priority of the second upstream data. The processing unit is specifically configured to: determine the first upstream transmission timeslot of the first transmission container and the first upstream transmission rate of the first transmission container based on the priority of the first upstream data; and determine the second upstream transmission timeslot of the second transmission container and the second upstream transmission rate of the second transmission container based on the priority of the second upstream data.

In some possible implementations, a priority of the first transmission container is higher than a priority of the second transmission container, the first transmission container is configured to store the first upstream data, and the second transmission container is configured to store the second upstream data.

In some possible implementations, the to-be-transmitted data amount is equal to a product of duration of the upstream transmission timeslot and the upstream transmission rate.

In some possible implementations, the OLT further includes a channel monitoring unit. The channel monitoring unit is configured to perform channel monitoring on the upstream data sent by the ONU, to obtain the transmission quality information.

In some possible implementations, the transmission quality information includes at least one of an SNR, an EVM, and a quality factor.

According to a fourth aspect, this application provides an ONU. The ONU includes a receiving unit and a sending unit. The receiving unit is configured to receive configuration information sent by an optical line terminal OLT. The configuration information indicates an upstream transmission timeslot of the ONU and an upstream transmission rate of the ONU. The upstream transmission timeslot and the upstream transmission rate are determined by the OLT, and the upstream transmission rate is less than or equal to an upstream rate threshold. The upstream rate threshold is determined by the OLT based on transmission quality information of upstream data sent by the ONU. The sending unit is configured to send data of the to-be-transmitted data amount to the OLT in the upstream transmission timeslot based on the upstream transmission rate. The to-be-transmitted data amount is obtained by the OLT, to be used as one of bases for determining, by the OLT, the upstream transmission timeslot and the upstream transmission rate.

In some possible implementations, the configuration information includes a BWmap, a first field in the BWmap indicates the upstream transmission timeslot of the ONU, and a second field in the BWmap indicates the upstream transmission rate of the ONU.

In some possible implementations, the configuration information includes a data frame and a control frame, a BWmap in the data frame indicates the upstream transmission timeslot of the ONU, and a rate configuration table in the control frame indicates the upstream transmission rate of the ONU.

In some possible implementations, the ONU includes a plurality of transmission containers, and the ONU includes a first transmission container and a second transmission container. The transmission quality information includes first transmission quality information of first upstream data sent by the first transmission container and second transmission quality information of second upstream data sent by the second transmission container. The upstream rate threshold includes a first upstream rate threshold of the first transmission container and a second upstream rate threshold of the second transmission container. The first upstream rate threshold is determined by the OLT based on the first transmission quality information. The second upstream rate threshold is determined by the OLT based on the second transmission quality information.

In some possible implementations, the configuration information indicates a first upstream transmission timeslot of the first transmission container, a first upstream transmission rate of the first transmission container, a second upstream transmission timeslot of the second transmission container, and a second upstream transmission rate of the second transmission container. The to-be-transmitted data amount of the ONU includes a first to-be-transmitted data amount of the first transmission container and a second to-be-transmitted data amount of the second transmission container. The upstream transmission timeslot includes the first upstream transmission timeslot and the second upstream transmission timeslot. The upstream transmission rate includes the first upstream transmission rate and the second upstream transmission rate. The first upstream transmission timeslot and the first upstream transmission rate are determined by the OLT. The second upstream transmission timeslot and the second upstream transmission rate are determined by the OLT. The first upstream transmission rate is less than or equal to the first upstream rate threshold, and the first transmission container is configured to send data of the first to-be-transmitted data amount to the OLT in the first upstream transmission timeslot based on the first upstream transmission rate. The second upstream transmission rate is less than or equal to the second upstream rate threshold, and the second transmission container is configured to send data of the second to-be-transmitted data amount to the OLT in the second upstream transmission timeslot based on the second upstream transmission rate.

In some possible implementations, a priority of the first upstream data is different from a priority of the second upstream data. The first upstream transmission timeslot and the first upstream transmission rate are determined by the OLT based on the priority of the first upstream data. The second upstream transmission timeslot and the second upstream transmission rate are determined by the OLT based on the priority of the second upstream data.

In some possible implementations, a priority of the first transmission container is higher than a priority of the second transmission container, the first transmission container is configured to store the first upstream data, and the second transmission container is configured to store the second upstream data.

In some possible implementations, the to-be-transmitted data amount is equal to a product of duration of the upstream transmission timeslot and the upstream transmission rate.

In some possible implementations, the transmission quality information includes at least one of a signal-to-noise ratio SNR, an error vector magnitude EVM, and a quality factor.

According to a fifth aspect, this application provides a communications system, including the OLT according to the third aspect and the ONU according to the fourth aspect.

According to a sixth aspect, this application provides a chip. The chip includes a logic circuit and/or program instructions, and when running, the chip implements the method in any implementation of the first aspect.

According to a seventh aspect, an embodiment of this application provides a computer-readable storage medium. The computer-readable storage medium stores a computer program. When the computer program is executed by hardware, some or all of steps of any method in the first aspect or the second aspect can be implemented.

In embodiments of this application, the OLT determines the upstream rate threshold of the ONU based on the transmission quality information of the upstream data sent by the ONU. The OLT further obtains the to-be-transmitted data amount of the ONU. Then, the OLT determines the upstream transmission timeslot of the ONU and the upstream transmission rate of the ONU based on the upstream rate threshold of the ONU and the to-be-transmitted data amount of the ONU. In the foregoing manner, the upstream transmission resource allocated by the OLT to the ONU includes the upstream transmission timeslot of the ONU, and further includes the upstream transmission rate of the ONU. In addition to different to-be-transmitted data amounts, different ONUs may have different upstream rate thresholds. Therefore, the OLT can more properly allocate upstream transmission resources to different ONUs by comprehensively considering upstream rate thresholds of the ONUs and to-be-transmitted data amounts of the ONUs, thereby effectively avoiding a waste of upstream transmission resources.

DETAILED DESCRIPTION OF ILLUSTRATIVE EMBODIMENTS

This application provides an upstream transmission resource allocation method and a related device. An OLT can more properly allocate upstream transmission resources to different ONUs by comprehensively considering upstream rate thresholds of the ONUs and to-be-transmitted data amounts of the ONUs, thereby effectively avoiding a waste of upstream transmission resources.

This application is mainly applied to a passive optical network (PON) system. The following describes a system architecture of a PON.

Figures 1, 2:
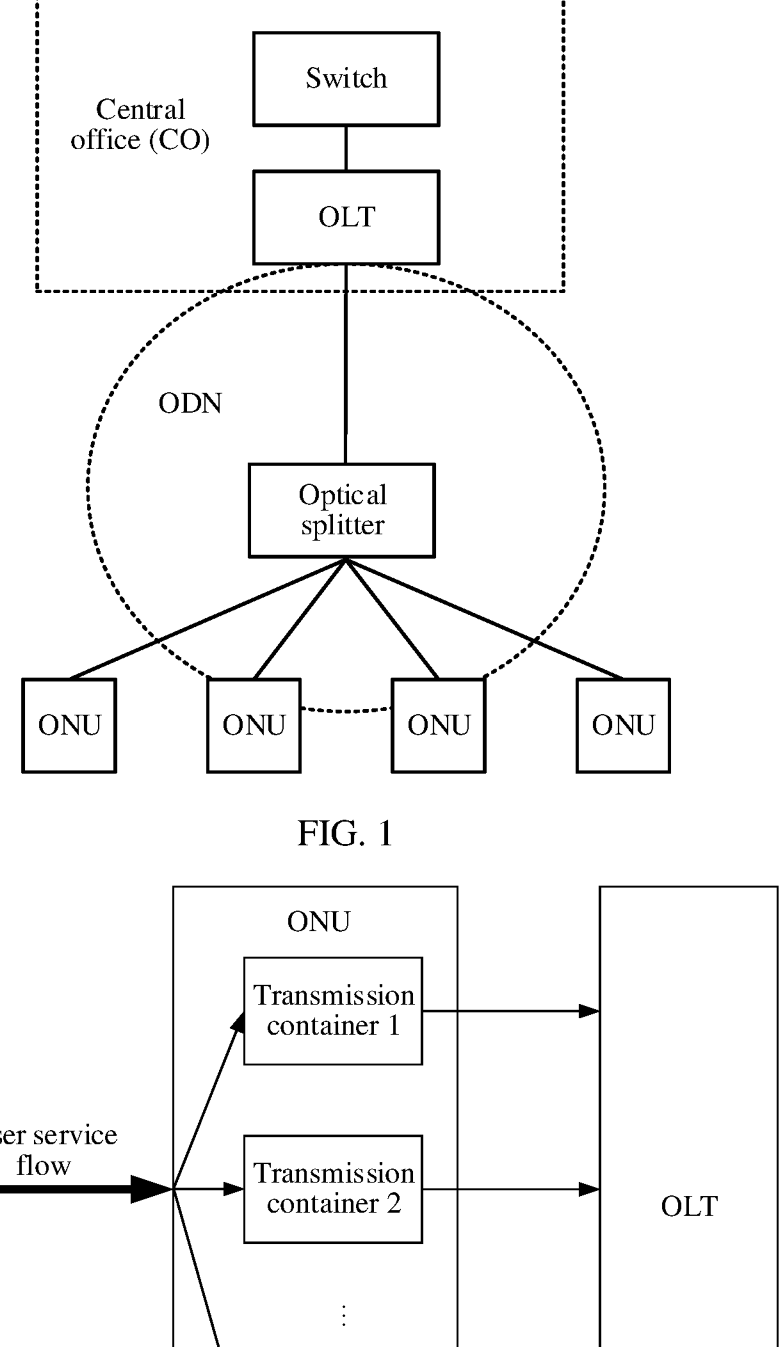
FIG. 1 is a schematic diagram of a system architecture of a PON.
FIG. 2 is a schematic diagram of a structure of an ONU including transmission containers.

FIG. 1 is a schematic diagram of a system architecture of a PON. An OLT is connected to an upper-layer network side device (for example, a switch or a router), and is connected to one or more optical distribution networks (ODN) at a lower layer. The ODN includes a passive optical splitter for optical power distribution, a feeder fiber connected between the passive optical splitter and the OLT, and distribution fibers connected between the passive optical splitter and ONUs. During downstream data transmission, the OLT sends downstream data in a broadcast manner, the ODN transmits the downstream data of the OLT to the ONUs by using the optical splitter, and the ONU selectively receives downstream data that carries an identifier of the ONU. During upstream data transmission, to avoid collisions between different ONUs, different ONUs send upstream data to the OLT in different timeslots, and the ODN combines N optical signals sent by the ONUs into one optical signal and transmits the optical signal to the OLT. It should be understood that, if the ONU also provides a user port function, for example, the ONU provides an Ethernet user port or a plain old telephone service (POTS) user port, the ONU is referred to as an optical network terminal (ONT).

It should be noted that, in a gigabit-capable PON (GPON) system, a transmission container (T-CONT) is a carrier that carries a service in an upstream direction. FIG. 2 is a schematic diagram of a structure of an ONU including transmission containers. As shown in FIG. 2, the ONU includes a plurality of transmission containers. Each transmission container is an independent storage unit, and the ONU separately maps a to-be-transmitted service to different transmission containers for buffering. The ONU may send an amount of data buffered in each transmission container to the OLT by using a dynamic bandwidth report upstream (DBRu) field in a GPON transmission convergence (GTC) frame. Then, the OLT allocates a corresponding upstream transmission resource to each transmission container, that is, the transmission container is a basic unit used by the OLT to perform upstream transmission resource assignment.

Figure 3:
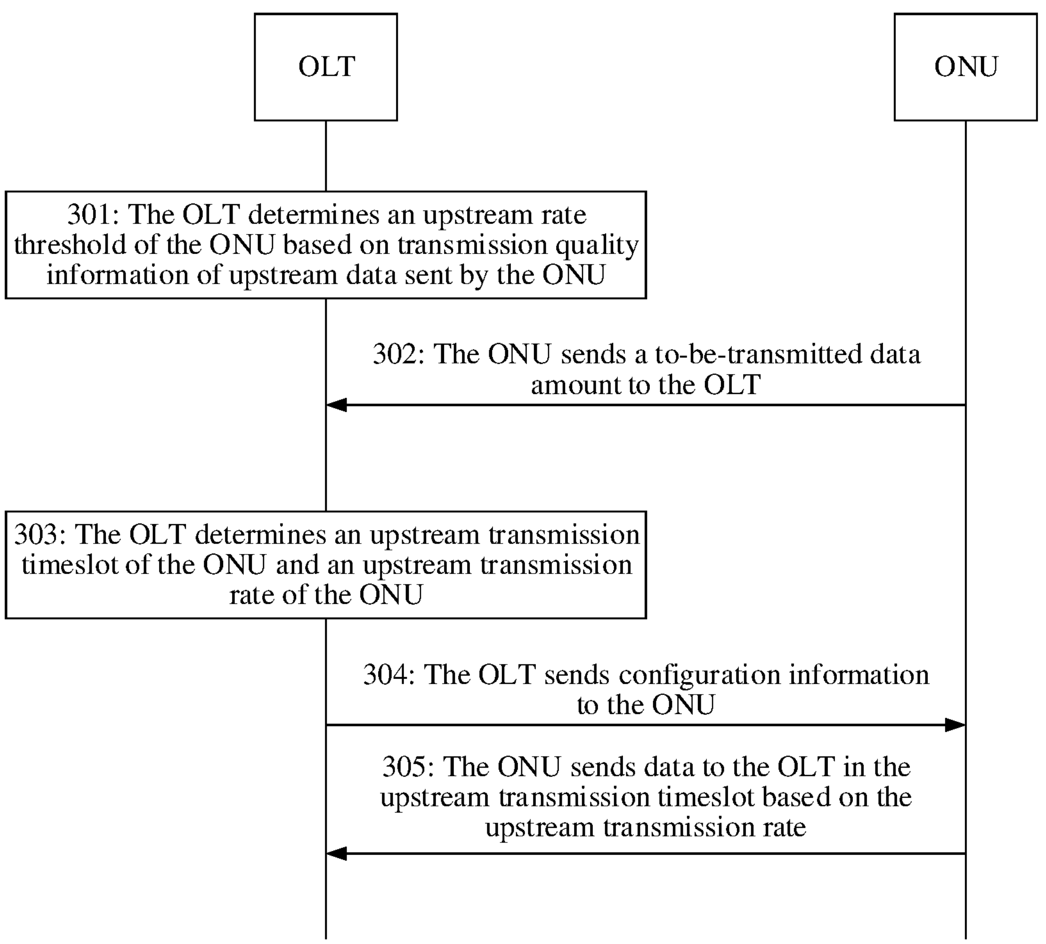
FIG. 3 is a schematic diagram of an embodiment of an upstream transmission resource allocation method according to this application.

FIG. 3 is a schematic diagram of an embodiment of an upstream transmission resource allocation method according to this application. It should be noted that an upstream transmission resource includes an upstream transmission timeslot and an upstream transmission rate. In this example, the upstream transmission resource allocation method includes the following steps.

301: An OLT determines an upstream rate threshold of an ONU based on transmission quality information of upstream data sent by the ONU.

In this embodiment, the OLT may perform channel monitoring on the upstream data sent by the ONU, to obtain the transmission quality information of the upstream data. Specifically, the transmission quality information includes at least one of a signal-to-noise ratio (SNR), an error vector magnitude (EVM), a quality factor (Q-factor), and the like. Then, the OLT can determine the upstream rate threshold of the ONU based on the obtained transmission quality information. It should be understood that the upstream rate threshold of the ONU is less than or equal to a maximum sending rate that can be supported by the ONU in a current status. In different channel conditions, the ONU has different upstream transmission quality. The upstream transmission quality directly affects the maximum sending rate that can be currently supported by the ONU. For example, if an SNR of current upstream transmission is higher, the ONU can support a higher maximum sending rate; or if an SNR of current upstream transmission is lower, the ONU can support a lower maximum sending rate. That is, the upstream rate threshold of the ONU is not a fixed value, and the upstream rate threshold changes with different upstream transmission quality conditions.

In some possible implementations, the ONU includes a plurality of transmission containers, and upstream data sent by the ONU by using different transmission containers may have different transmission quality. In this case, the OLT performs channel monitoring on upstream data sent by each transmission container, to obtain transmission quality information of each transmission container. Then, the OLT determines, based on the transmission quality information of each transmission container, an upstream rate threshold corresponding to each transmission container.

302: The ONU sends a to-be-transmitted data amount to the OLT.

The to-be-transmitted data amount of the ONU may be understood as an amount of data buffered in the ONU for a period of time. The ONU sends the to-be-transmitted data amount to the OLT, so that the OLT learns of an amount of data the ONU currently needs to transmit. In some possible implementations, the ONU includes a plurality of transmission containers, and each transmission container has an independent buffer. The ONU may send an amount of data stored in the buffer of each transmission container to the OLT by using a DBRu field in a GTC frame.

303: The OLT determines an upstream transmission timeslot of the ONU and an upstream transmission rate of the ONU.

In this embodiment, the OLT may allocate the upstream transmission timeslot and the upstream transmission rate to the ONU based on the to-be-transmitted data amount of the ONU, to ensure, as much as possible, that the upstream transmission timeslot is sufficient to transmit data of the to-be-transmitted data amount, and the upstream transmission rate cannot exceed the upstream rate threshold. For example, the to-be-transmitted data amount of the ONU may be equal to a product of duration of the upstream transmission timeslot and the upstream transmission rate of the ONU, so that an upstream transmission resource allocated by the OLT exactly meets a transmission requirement of the ONU. For another example, in a scenario in which to-be-allocated upstream transmission resources are sufficient, the to-be-transmitted data amount of the ONU may be less than the product of the duration of the upstream transmission timeslot and the upstream transmission rate of the ONU, that is, an upstream transmission resource allocated by the OLT to the ONU may be greater than a transmission requirement of the ONU. For another example, in a scenario in which to-be-allocated upstream transmission resources are insufficient, the to-be-transmitted data amount of the ONU may be greater than the product of the duration of the upstream transmission timeslot and the upstream transmission rate of the ONU, that is, an upstream transmission resource allocated by the OLT to the ONU may be less than a transmission requirement of the ONU.

Specifically, on a premise that it is ensured that the upstream transmission rate of the ONU does not exceed the upstream rate threshold, the OLT may flexibly allocate the upstream transmission timeslot and the upstream transmission rate to the ONU based on the to-be-transmitted data amount of the ONU. For example, the to-be-transmitted data amount of the ONU is fixed. The OLT may allocate an upstream transmission rate of 50 Gb/s and duration of an upstream transmission timeslot of 20 ns to the ONU, or the OLT may allocate an upstream transmission rate of 10 Gb/s and duration of an upstream transmission timeslot of 100 ns to the ONU. It should be noted that, if the ONU is a new ONU that gets online, the OLT cannot obtain current transmission quality information of the ONU. The OLT allocates a relatively low upstream transmission rate to the ONU by default, to prevent the allocated upstream transmission rate from exceeding a maximum sending rate that can be currently supported by the ONU.

It should be understood that, theoretically, it is feasible as long as the upstream transmission rate allocated to the ONU does not exceed the upstream rate threshold. However, in actual application, the upstream transmission rate needs to be properly allocated to the ONU based on the to-be-transmitted data amount and the upstream rate threshold. For example, when a current to-be-transmitted data amount of the ONU is relatively large, it may be considered that an upstream transmission rate close to or equal to the upstream rate threshold is allocated to the ONU, to ensure that data is completely transmitted in relatively short time, thereby preventing the ONU from affecting upstream transmission of another ONU because of occupying relatively long time. For another example, when a current to-be-transmitted data amount of the ONU is relatively small, even if the upstream rate threshold of the ONU is relatively high, it may be considered that a relatively small upstream transmission rate is allocated to the ONU, so that data is completely transmitted in relatively long time, thereby reducing a packet loss rate of a transmission link and improving user experience. For another example, when the upstream rate threshold of the ONU is relatively small, even if upstream transmission is performed based on the upstream rate threshold, a relatively low packet loss rate can be ensured. In this case, it is naturally considered that a maximum sending rate that can be supported by the ONU is allocated to the ONU to perform upstream transmission, to improve transmission efficiency.

It can be learned from the foregoing descriptions that a general rule for allocating, by the OLT, the upstream transmission resource to the ONU is designed in this application, that is, the OLT allocates the upstream transmission timeslot and the upstream transmission rate to the ONU with reference to the upstream rate threshold and the to-be-transmitted data amount of the ONU. However, under constraint of the rule, an implementation is not unique. The OLT may flexibly allocate the upstream transmission timeslot and the upstream transmission rate to the ONU based on an actual requirement. This is not specifically limited herein.

In some possible implementations, the ONU includes a plurality of transmission containers, and the OLT allocates a corresponding upstream transmission timeslot and upstream transmission rate to each transmission container based on a to-be-transmitted data amount of each transmission container and an upstream rate threshold of each transmission container. The following provides descriptions by using an example in which the ONU includes a first transmission container and a second transmission container. It should be noted that, because priorities of to-be-transmitted data in the first transmission container and the second transmission container may be different, the OLT further allocates a corresponding upstream transmission resource to each transmission container with reference to a priority of data. It should be understood that to-be-transmitted data in the first transmission container is first upstream data, and to-be-transmitted data in the second transmission container is second upstream data. Specifically, the OLT determines a first upstream transmission timeslot and a first upstream transmission rate of the first transmission container based on a priority of the first upstream data. The OLT determines a second upstream transmission timeslot and a second upstream transmission rate of the second transmission container based on a priority of the second upstream data.

For example, if the first upstream data has a relatively high priority and there is a relatively high requirement on transmission quality of the first upstream data, it may be considered that an upstream transmission rate less than a first upstream rate threshold is allocated to the first transmission container, so that the first upstream data is completely transmitted in relatively long time, thereby reducing a packet loss rate of a transmission link and improving user experience. For another example, if the second upstream data has a relatively low priority and there is a relatively low requirement on transmission quality of the second upstream data, it may be considered that an upstream transmission rate close to or equal to a second upstream rate threshold is allocated to the second transmission container, so that the second upstream data is completely transmitted in relatively short time, thereby improving transmission efficiency. It should be understood that, in the examples listed herein, a priority of upstream data is used as a preferentially considered parameter to allocate an upstream transmission resource. In actual application, the to-be-transmitted data amount or the upstream rate threshold may be alternatively used as a preferentially considered parameter to allocate the upstream transmission resource. A vendor may determine a weight of each parameter based on a requirement of the vendor, to formulate an upstream transmission resource allocation policy. This is not specifically limited in this application.

It should be noted that, a transmission container that stores data with a higher priority also has a higher priority, and the OLT preferentially allocates a corresponding upstream transmission timeslot and upstream transmission rate to the transmission container of the higher priority. For example, if the priority of the first upstream data is higher than the priority of the second upstream data, a priority of the first transmission container is also higher than a priority of the second transmission container. The OLT first allocates an upstream transmission resource to the first transmission container, and then allocates an upstream transmission resource to the second transmission container.

As an example, transmission containers may be classified into different types based on different priorities of the transmission containers. The following provides a specific classification manner of transmission container types. It should be understood that in actual application, classification may be alternatively performed in another manner. This is not specifically limited herein. For example, the transmission containers may be classified into a fixed type, a guaranteed type, a non-guaranteed type, and a best-effort type. Specifically, the fixed type indicates that the OLT always allocates a fixed upstream transmission timeslot and a fixed upstream transmission rate to a transmission container. The guaranteed type indicates that the OLT allocates a corresponding upstream transmission timeslot and upstream transmission rate to a transmission container based on an amount of data buffered in the transmission container and an upstream rate threshold of the transmission container, to meet a transmission requirement of the transmission container. The non-guaranteed type indicates that the OLT tries its best to allocate a corresponding upstream transmission timeslot and upstream transmission rate to a transmission container based on an amount of data buffered in the transmission container and an upstream rate threshold of the transmission container. However, if currently remaining upstream transmission resources of the OLT are insufficient, the OLT reclaims an upstream transmission resource allocated to the transmission container of the non-guaranteed type, and allocates the reclaimed upstream transmission resource to a transmission container that is of the guaranteed type and that needs an upstream transmission resource. The best-effort type indicates that if there are still remaining upstream transmission resources after the OLT allocates upstream transmission resources to transmission containers of other types, the OLT evenly allocates the remaining upstream transmission resources to transmission containers of this type.

Based on the foregoing described classification manner of the transmission container types, the OLT may allocate an upstream transmission resource to each transmission container by using four steps. Step 1: The OLT allocates a fixed upstream transmission timeslot and upstream transmission rate to a transmission container of the fixed type. If a requirement of a transmission container for a fixed rate exceeds an upstream rate threshold of the transmission container, alarm information is generated, and the OLT allocates an upstream transmission rate to the transmission container based on the upstream rate threshold of the transmission container. Step 2: The OLT allocates a corresponding upstream transmission timeslot and upstream transmission rate to a transmission container of the guaranteed type. Step 3: The OLT allocates a corresponding upstream transmission timeslot and upstream transmission rate to a transmission container of the non-guaranteed type. Step 4: The OLT allocates a corresponding upstream transmission timeslot and upstream transmission rate to a transmission container of the best-effort type. For the transmission container of the best-effort type, the OLT usually allocates an upstream transmission rate to the transmission container based on an upstream rate threshold of the transmission container.

304: The OLT sends configuration information to the ONU.

After the OLT allocates the upstream transmission timeslot and the upstream transmission rate to the ONU, the OLT sends the configuration information to the ONU. The ONU may learn of, by using the configuration information, the upstream transmission timeslot and the upstream transmission rate that are allocated to the ONU. The following describes specific forms of several types of configuration information provided in this application.

Type 1: The upstream transmission timeslot and the upstream transmission rate are configured by using a bandwidth map (BWmap) in a data frame.

Figure 4:
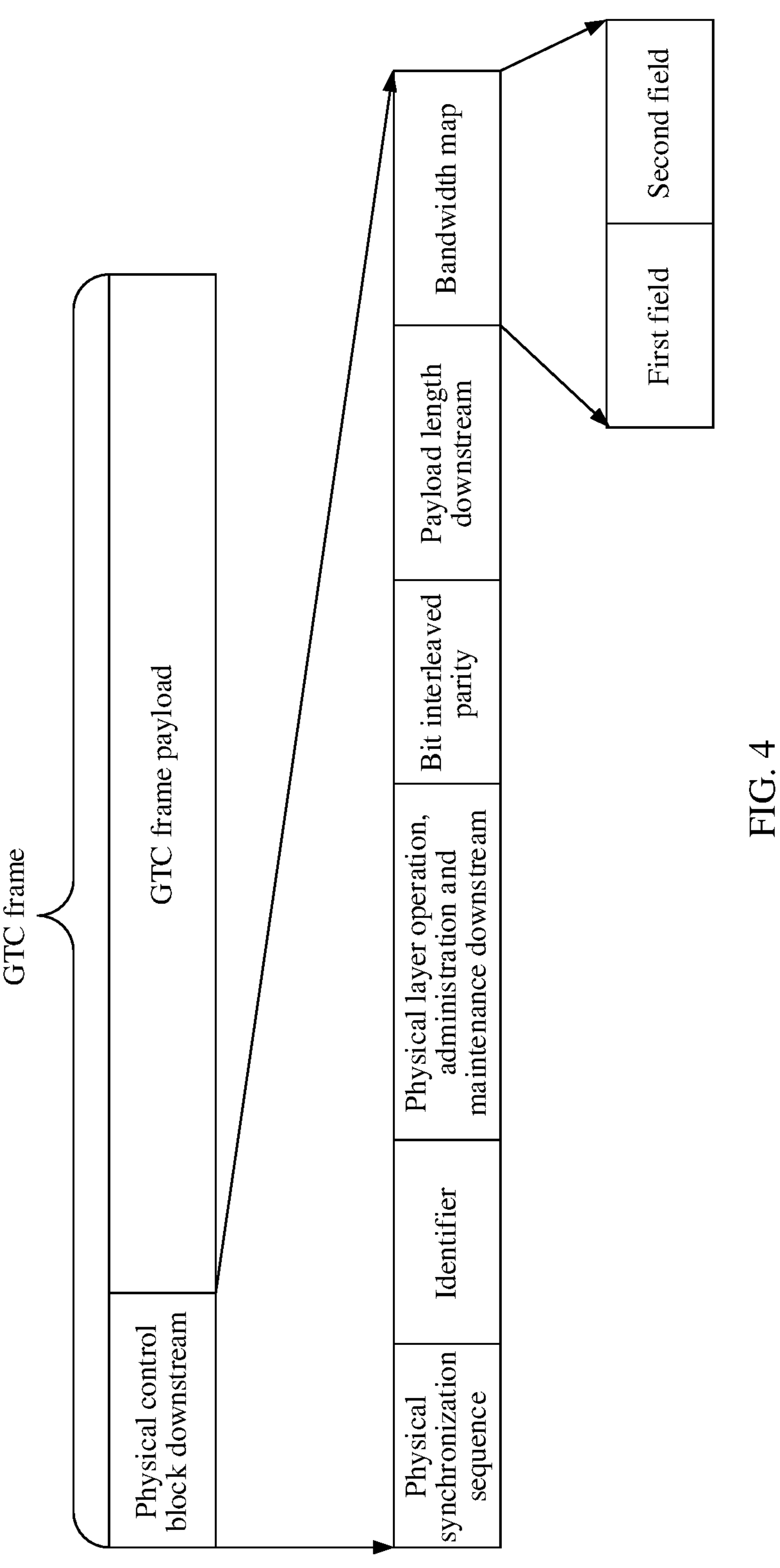
FIG. 4 is a schematic diagram of configuring an upstream transmission resource by using a BWmap according to this application.

FIG. 4 is a schematic diagram of configuring an upstream transmission resource by using a BWmap according to this application. As shown in FIG. 4, the data frame may specifically use a structure of a GTC frame, and a frame header is a physical control block downstream (PCBd). The PCBd includes a physical synchronization sequence (Psync), an identifier (Ident), physical layer operation, administration and maintenance downstream (PLOAMd), bit interleaved parity (bit interleaved parity, BIP), a payload length downstream (Plend), and a bandwidth map (BWmap). A first field in the BWmap indicates the upstream transmission timeslot of the ONU, and a second field in the BWmap indicates the upstream transmission rate of the ONU.

Type 2: The upstream transmission timeslot is configured by using a BWmap in a data frame, and the upstream transmission rate is configured by using a rate configuration table in a control frame.

Figure 5:
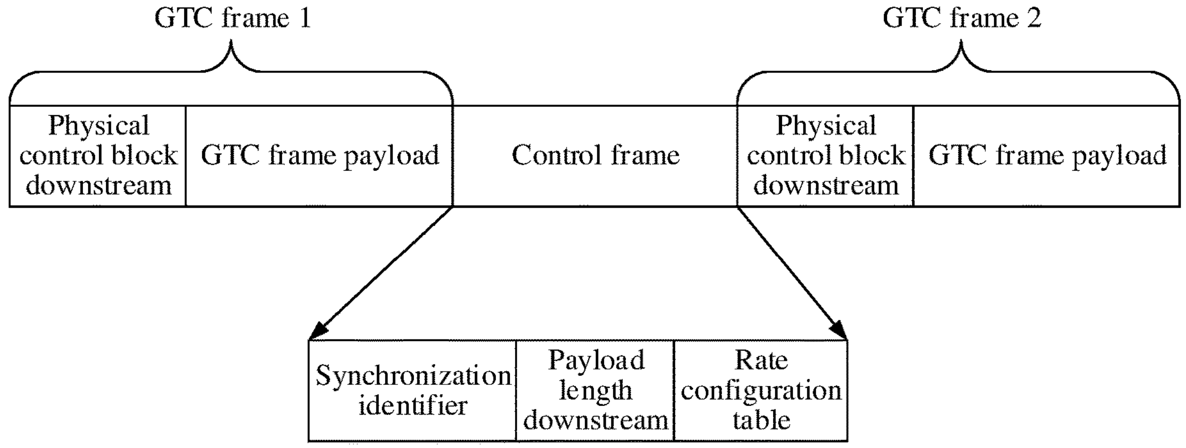
FIG. 5 is a schematic diagram of configuring an upstream transmission resource with reference to a data frame and a control frame according to this application.

FIG. 5 is a schematic diagram of configuring an upstream transmission resource with reference to a data frame and a control frame according to this application. As shown in FIG. 5, the data frame may specifically use a structure of a GTC frame, and the upstream transmission timeslot of the ONU is indicated by using a BWmap in the data frame. For details, refer to the descriptions in FIG. 4. Details are not described herein again. A control frame may be inserted between GTC frames, and the control frame includes a synchronization identifier field, a payload length downstream field, and a rate configuration table field. The ONU may identify the control frame by using the synchronization identifier field, and the rate configuration table field indicates the upstream transmission rate of the ONU. It should be understood that, in actual application, upstream transmission rates may be configured for a plurality of ONUs by using one control frame.

305: The ONU sends data to the OLT in the upstream transmission timeslot based on the upstream transmission rate.

In this embodiment of this application, the OLT determines the upstream rate threshold of the ONU based on the transmission quality information of the upstream data sent by the ONU. The OLT further obtains the to-be-transmitted data amount of the ONU. Then, the OLT determines the upstream transmission timeslot of the ONU and the upstream transmission rate of the ONU based on the upstream rate threshold of the ONU and the to-be-transmitted data amount of the ONU. In the foregoing manner, the upstream transmission resource allocated by the OLT to the ONU includes the upstream transmission timeslot of the ONU, and further includes the upstream transmission rate of the ONU. In addition to different to-be-transmitted data amounts, different ONUs may have different upstream rate thresholds. Therefore, the OLT can more properly allocate upstream transmission resources to different ONUs by comprehensively considering upstream rate thresholds of the ONUs and to-be-transmitted data amounts of the ONUs, thereby effectively avoiding a waste of upstream transmission resources.

The following describes an OLT and an ONU provided in this application.

Figure 6:
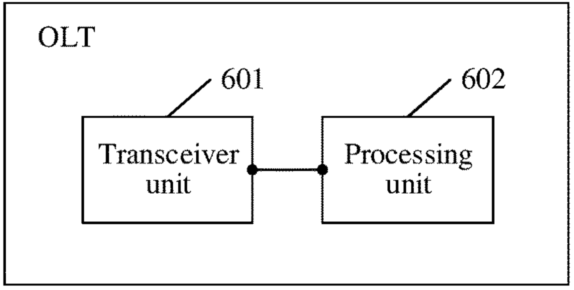
FIG. 6 is a possible schematic diagram of a structure of an OLT according to an embodiment of this application.

FIG. 6 is a possible schematic diagram of a structure of an OLT according to an embodiment of this application. As shown in FIG. 6, the OLT includes a transceiver unit 601 and a processing unit 602. Specifically, the transceiver unit 601 is configured to perform the operations in step 302, step 304, and step 305 in the embodiment shown in FIG. 3. The processing unit 602 is configured to perform the operations in step 301 and step 303 in the embodiment shown in FIG. 3.

Figure 7:
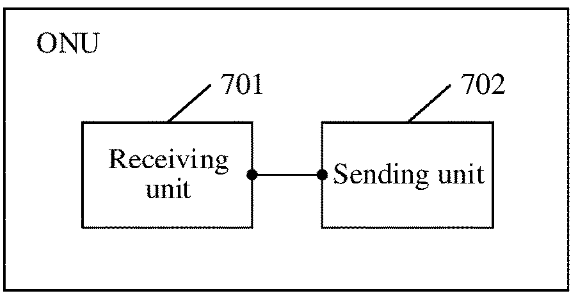
FIG. 7 is a possible schematic diagram of a structure of an ONU according to an embodiment of this application.

FIG. 7 is a possible schematic diagram of a structure of an ONU according to an embodiment of this application. As shown in FIG. 7, the ONU includes a receiving unit 701 and a sending unit 702. Specifically, the receiving unit 701 is configured to perform the operation in step 304 in the embodiment shown in FIG. 3. The sending unit 702 is configured to perform the operations in step 302 and step 305 in the embodiment shown in FIG. 3.

Figure 8:
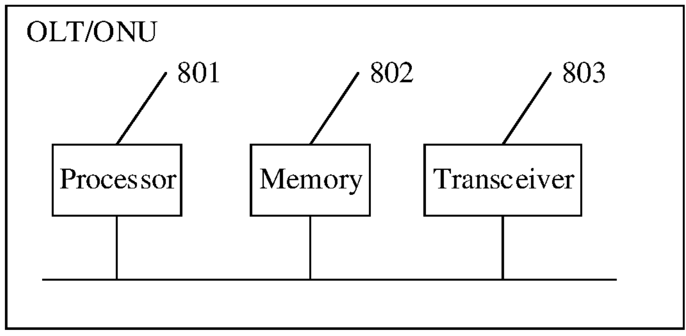
FIG. 8 is another possible schematic diagram of a structure of an OLT/ONU according to an embodiment of this application.

FIG. 8 is another possible schematic diagram of a structure of an OLT/ONU according to an embodiment of this application. As shown in FIG. 8, the OLT/ONU includes a processor 801, a memory 802, and a transceiver 803. The processor 801, the memory 802, and the transceiver 803 are interconnected through lines. The memory 802 is configured to store program instructions and data. Specifically, the transceiver 803 is configured to perform the data sending and receiving operations in the steps shown in FIG. 3. The processor 801 is configured to perform operations other than the data sending and receiving operations in the steps shown in FIG. 3. In a possible implementation, the processor 801 may include the processing unit 602 shown in FIG. 6, and the transceiver 803 may include the transceiver unit 601 shown in FIG. 6. In another possible implementation, the transceiver 803 may include the receiving unit 701 and the sending unit 702 shown in FIG. 7.

It should be noted that the processor shown in FIG. 8 may use a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The memory shown in FIG. 8 may store an operating system and another application. When the technical solutions provided in embodiments of this application are implemented by using software or firmware, program code used to implement the technical solutions provided in embodiments of this application is stored in the memory and is executed by the processor. In an embodiment, the processor may include the memory inside. In another embodiment, the processor and the memory are two independent structures.

Figure 9:
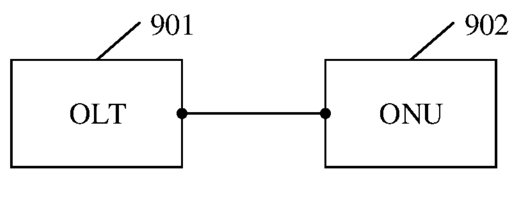
FIG. 9 is a possible schematic diagram of a structure of a communications system according to this application.

FIG. 9 is a possible schematic diagram of a structure of a communications system according to this application. As shown in FIG. 9, the communications system includes an OLT 901 and an ONU 902. The OLT 901 is configured to perform some or all of steps of any method performed by the OLT in the embodiment shown in FIG. 3. The ONU 902 is configured to perform some or all of steps of any method performed by the ONU in the embodiment shown in FIG. 3.

This application further provides a chip. The chip includes a logic circuit and/or program instructions, and when running, the chip implements some or all of steps of any method performed by the OLT in the embodiment shown in FIG. 3. Specifically, the chip may be a medium access control (MAC) chip. In a possible implementation, referring to step 301 in the embodiment shown in FIG. 3, the MAC chip performs channel monitoring on the upstream data sent by the ONU, to obtain the transmission quality information of the upstream data, and then determines the upstream rate threshold of the ONU based on the transmission quality information. In another possible implementation, referring to step 301 in the embodiment shown in FIG. 3, a digital signal processing (DSP) chip of a physical layer may perform channel monitoring on the upstream data sent by the ONU, to obtain the transmission quality information of the upstream data; and then the DSP chip sends the transmission quality information to the MAC chip, and the MAC chip determines the upstream rate threshold of the ONU based on the transmission quality information.

A person of ordinary skill in the art may understand that all or some of the steps in the foregoing embodiments may be implemented by using hardware or a program instructing related hardware. The program may be stored in a computer-readable storage medium. The storage medium mentioned above may be a read-only memory, a random access memory, or the like. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When software is used to implement the functions, all or some of the method steps described in the foregoing embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Drive (SSD)), or the like.

What is claimed is:

1. An upstream transmission resource allocation method, comprising:

determining, by an optical line terminal (OLT), an upstream rate threshold of an optical network unit (ONU) based on transmission quality information of upstream data sent by the ONU, wherein the transmission quality information comprises at least one of a signal-to-noise ratio (SNR), an error vector magnitude (EVM), or a quality factor (Q-factor);

obtaining, by the OLT, a to-be-transmitted data amount of the ONU;

determining, by the OLT, an upstream transmission timeslot of the ONU and an upstream transmission rate of the ONU, wherein the upstream transmission rate is determined based on the to-be-transmitted data amount of the ONU and the upstream rate threshold, and the upstream transmission rate is less than or equal to the upstream rate threshold; and receiving, by the OLT, data of the to-be-transmitted data amount from the ONU in the upstream transmission timeslot based on the upstream transmission rate.

2. The method according to claim 1, wherein the method further comprises sending, by the OLT, configuration information to the ONU, wherein the configuration information indicates the upstream transmission timeslot of the ONU and the upstream transmission rate of the ONU.

3. The method according to claim 2, wherein the configuration information comprises a bandwidth map (BWmap), wherein a first field in the BWmap indicates the upstream transmission timeslot of the ONU, and wherein a second field in the BWmap indicates the upstream transmission rate of the ONU.

4. The method according to claim 2, wherein the configuration information comprises a data frame and a control frame, wherein a BWmap in the data frame indicates the upstream transmission timeslot of the ONU, and wherein a rate configuration table in the control frame indicates the upstream transmission rate of the ONU.

5. The method according to claim 1, wherein the ONU comprises a plurality of transmission containers including a first transmission container and a second transmission container;

wherein the transmission quality information comprises first transmission quality information of first upstream data sent by the first transmission container and second transmission quality information of second upstream data sent by the second transmission container;

wherein the upstream rate threshold comprises a first upstream rate threshold of the first transmission container and a second upstream rate threshold of the second transmission container; and wherein determining the upstream rate threshold based on the transmission quality information comprises determining, by the OLT, the first upstream rate threshold based on the first transmission quality information and determining the second upstream rate threshold based on the second transmission quality information.

6. The method according to claim 5, wherein the to-be-transmitted data amount of the ONU comprises a first to-be-transmitted data amount of the first transmission container and a second to-be-transmitted data amount of the second transmission container; and wherein determining the upstream transmission timeslot of the ONU and the upstream transmission rate of the ONU comprises determining, by the OLT, a first upstream transmission timeslot of the first transmission container and a first upstream transmission rate of the first transmission container;

wherein the first upstream transmission rate is less than or equal to the first upstream rate threshold, and the first transmission container is configured to send data of the first to-be-transmitted data amount to the OLT in the first upstream transmission timeslot based on the first upstream transmission rate;

wherein determining the upstream transmission timeslot of the ONU and the upstream transmission rate of the ONU comprises determining, by the OLT, a second upstream transmission timeslot of the second transmission container and a second upstream transmission rate of the second transmission container;

wherein the second upstream transmission rate is less than or equal to the second upstream rate threshold, and the second transmission container is configured to send data of the second to-be-transmitted data amount to the OLT in the second upstream transmission timeslot based on the second upstream transmission rate;

wherein the upstream transmission timeslot comprises the first upstream transmission timeslot and the second upstream transmission timeslot; and wherein the upstream transmission rate comprises the first upstream transmission rate and the second upstream transmission rate.

7. An upstream transmission resource allocation method, comprising:

receiving, by an optical network unit (ONU), configuration information sent by an optical line terminal (OLT), wherein the configuration information indicates an upstream transmission timeslot of the ONU and an upstream transmission rate of the ONU, the upstream transmission timeslot and the upstream transmission rate having been determined by the OLT, wherein the upstream transmission rate is less than or equal to an upstream rate threshold, wherein the upstream transmission rate is determined based on a to-be-transmitted data amount of the ONU and the upstream rate threshold, wherein the upstream rate threshold is determined by the OLT based on transmission quality information of upstream data sent by the ONU, and wherein the transmission quality information comprises at least one of a signal-to-noise ratio (SNR), an error vector magnitude (EVM), or a quality factor (Q-factor); and sending, by the ONU, data of the to-be-transmitted data amount to the OLT in the upstream transmission timeslot based on the upstream transmission rate.

8. The method according to claim 7, wherein the configuration information comprises a bandwidth map (BWmap), wherein a first field in the BWmap indicates the upstream transmission timeslot of the ONU, and wherein a second field in the BWmap indicates the upstream transmission rate of the ONU.

9. The method according to claim 7, wherein the configuration information comprises a data frame and a control frame, wherein a BWmap in the data frame indicates the upstream transmission timeslot of the ONU, and wherein a rate configuration table in the control frame indicates the upstream transmission rate of the ONU.

10. The method according to claim 7, wherein the ONU comprises a plurality of transmission containers including a first transmission container and a second transmission container;

wherein the transmission quality information comprises first transmission quality information of first upstream data sent by the first transmission container and second transmission quality information of second upstream data sent by the second transmission container;

wherein the upstream rate threshold comprises a first upstream rate threshold of the first transmission container and a second upstream rate threshold of the second transmission container; and wherein the first upstream rate threshold is based on the first transmission quality information and the second upstream rate threshold is based on the second transmission quality information.

11. The method according to claim 10, wherein the configuration information indicates a first upstream transmission timeslot of the first transmission container, a first upstream transmission rate of the first transmission container, a second upstream transmission timeslot of the second transmission container, and a second upstream transmission rate of the second transmission container;

wherein the to-be-transmitted data amount comprises a first to-be-transmitted data amount of the first transmission container and a second to-be-transmitted data amount of the second transmission container;

wherein the upstream transmission timeslot comprises the first upstream transmission timeslot and the second upstream transmission timeslot;

wherein the upstream transmission rate comprises the first upstream transmission rate and the second upstream transmission rate;

wherein the first upstream transmission rate is less than or equal to the first upstream rate threshold;

wherein the first transmission container is configured to send data of the first to-be-transmitted data amount to the OLT in the first upstream transmission timeslot based on the first upstream transmission rate;

wherein the second upstream transmission rate is less than or equal to the second upstream rate threshold; and wherein the second transmission container is configured to send data of the second to-be-transmitted data amount to the OLT in the second upstream transmission timeslot based on the second upstream transmission rate.

12. The method according to claim 11, wherein a priority of the first upstream data is different from a priority of the second upstream data, wherein the first upstream transmission timeslot and the first upstream transmission rate are based on the priority of the first upstream data, and the second upstream transmission timeslot and the second upstream transmission rate are based on the priority of the second upstream data.

13. The method according to claim 12, wherein a priority of the first transmission container is higher than a priority of the second transmission container, wherein the first transmission container is configured to store the first upstream data, and wherein the second transmission container is configured to store the second upstream data.

14. An optical network unit (ONU), comprising:

a receiver configured to receive configuration information sent by an optical line terminal (OLT), wherein the configuration information indicates an upstream transmission timeslot of the ONU and an upstream transmission rate of the ONU, the upstream transmission timeslot and the upstream transmission rate having been determined by the OLT, wherein the upstream transmission rate is less than or equal to an upstream rate threshold, wherein the upstream transmission rate is determined based on a to-be-transmitted data amount of the ONU and the upstream rate threshold, wherein the upstream rate threshold is based on transmission quality information of upstream data sent by the ONU, and wherein the transmission quality information comprises at least one of a signal-to-noise ratio (SNR), an error vector magnitude (EVM), or a quality factor (Q-factor); and a transmitter configured to send data of the to-be-transmitted data amount to the OLT in the upstream transmission timeslot based on the upstream transmission rate.

15. The ONU according to claim 14, wherein the configuration information comprises a bandwidth map (BWmap), wherein a first field in the BWmap indicates the upstream transmission timeslot of the ONU, and wherein a second field in the BWmap indicates the upstream transmission rate of the ONU.

16. The ONU according to claim 14, wherein the configuration information comprises a data frame and a control frame, wherein a BWmap in the data frame indicates the upstream transmission timeslot of the ONU, and wherein a rate configuration table in the control frame indicates the upstream transmission rate of the ONU.

17. The ONU according to claim 14, wherein the ONU comprises a plurality of transmission containers including a first transmission container and a second transmission container;

wherein the transmission quality information comprises first transmission quality information of first upstream data sent by the first transmission container and second transmission quality information of second upstream data sent by the second transmission container;

wherein the upstream rate threshold comprises a first upstream rate threshold of the first transmission container and a second upstream rate threshold of the second transmission container; and wherein the first upstream rate threshold is based on the first transmission quality information and the second upstream rate threshold is based on the second transmission quality information.

18. The ONU according to claim 17, wherein the configuration information indicates a first upstream transmission timeslot of the first transmission container, a first upstream transmission rate of the first transmission container, a second upstream transmission timeslot of the second transmission container, and a second upstream transmission rate of the second transmission container;

wherein the to-be-transmitted data amount comprises a first to-be-transmitted data amount of the first transmission container and a second to-be-transmitted data amount of the second transmission container;

wherein the upstream transmission timeslot comprises the first upstream transmission timeslot and the second upstream transmission timeslot;

wherein the upstream transmission rate comprises the first upstream transmission rate and the second upstream transmission rate;

wherein the first upstream transmission rate is less than or equal to the first upstream rate threshold;

wherein the first transmission container is configured to send data of the first to-be-transmitted data amount to the OLT in the first upstream transmission timeslot based on the first upstream transmission rate;

wherein the second upstream transmission rate is less than or equal to the second upstream rate threshold; and wherein the second transmission container is configured to send data of the second to-be-transmitted data amount to the OLT in the second upstream transmission timeslot based on the second upstream transmission rate.

19. The ONU according to claim 18, wherein a priority of the first upstream data is different from a priority of the second upstream data, wherein the first upstream transmission timeslot and the first upstream transmission rate are based on the priority of the first upstream data, and wherein the second upstream transmission timeslot and the second upstream transmission rate are based on the priority of the second upstream data.

20. The ONU according to claim 19, wherein a priority of the first transmission container is higher than a priority of the second transmission container, wherein the first transmission container is configured to store the first upstream data, and wherein the second transmission container is configured to store the second upstream data.

* * * * *